UNITED STATES PATENT OFFICE.

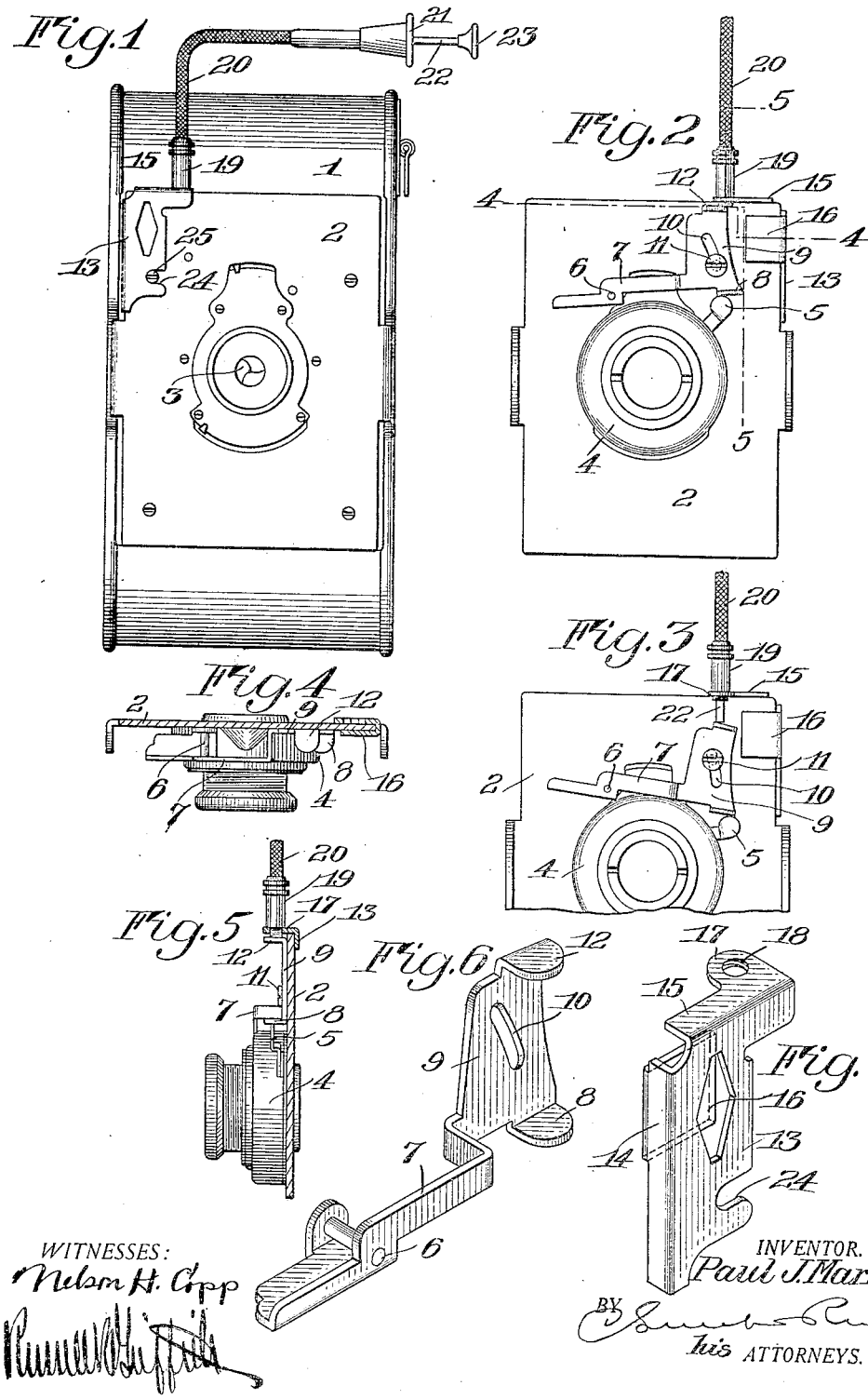

PAUL J. MARKS, OF ROCHESTER, NEW YORK, ASSIGNOR TO EASTMAN KODAK COMPANY, OF ROCHESTER, NEW YORK, A CORPORATION OF NEW YORK.

DETACHABLE SHUTTER-RELEASING DEVICE.

1,273,172.   Specification of Letters Patent.   Patented July 23, 1918.

Application filed June 21, 1917. Serial No. 176,220.

*To all whom it may concern:*

Be it known that I, PAUL J. MARKS, of Rochester, in the county of Monroe and State of New York, have invented certain new and useful Improvements in Detachable Shutter-Releasing Devices; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide a simple and convenient shutter releasing device that may be quickly and readily attached to and detached from a camera front or lens board so that the shutter may be operated by the well known flexible cable actuator quite independently of the specific character of shutter employed while at the same time the opening and closing of the camera from folded and extended positions will not be interfered with. To these and other ends the invention resides in certain improvements and combinations of parts all as will be hereinafter more fully described, the novel features being pointed out in the claims at the end of the specification.

In the drawings:

Figure 1 is a front elevation of a camera in extended position having attached thereto a detachable shutter releasing device constructed in accordance with and illustrating one embodiment of my invention;

Fig. 2 is a rear elevation of the camera front and shutter casing with the parts in normal position;

Fig. 3 is a similar view partly broken away with the parts in operated positions;

Fig. 4 is a transverse section taken substantially on the line 4—4 of Fig. 2;

Fig. 5 is a vertical section taken substantially on the line 5—5 of Fig. 2;

Fig. 6 is an enlarged detail perspective of the shutter operating lever, and

Fig. 7 is an enlarged detail perspective of the clip that detachably holds the releasing device to the camera front or lens board upon which the shutter is supported.

Similar reference numerals throughout the several views indicate the same parts.

The camera illustrated in the present embodiment of the invention is a folding roll holding pocket camera of a familiar type. It comprises a body 1 and an extensible front or lens board 2 connected to the body by bellows (not shown) and when the camera is folded the bellows occupy a compartment centrally of the body closed by the front 2 that then lies flush with the front face of the body 1. The precise nature of the shutter employed is not important herein and it will therefore be sufficient to explain that 3 indicates the blades (Fig. 1); 4 the casing, and 5 the exterior operating lever of any desired form of shutter the lens tube of which is alined with a central opening in the front 2. In the present instance, the body of the casing 4 and the operating lever 5 are disposed on the rear face of the front 2 by which latter the shutter is supported.

Pivoted to the rear face of the front at 6 just above the shutter casing is a shutter operating lever 7 having a lateral flange or finger 8 resting on the shutter operating member 5, normally in the manner indicated in Fig. 2. An enlarged portion 9 of the lever is slotted at 10 to coöperate with a headed guide pin 11 and above the finger 8 is a second flange or finger 12. When the lever 7 is depressed, as shown in Fig. 3, it depresses the shutter operating member 5 and effects an exposure and when the lever 7 is released it is returned to the normal position of Fig. 2, in the present instance, by the operating member 5 which is spring controlled as usual.

The front 2 of the present camera is rectangular and in the practice of my invention I provide for edgewise attachment thereto a spring clip 13 shown in detail in Fig. 7. This clip is substantially L-shaped and has a looped portion 14 spanning the vertical edge of the front and a flange 15 coöperating with the top horizontal edge so that the clip embraces a corner of the plate 2. The body portion thereof lies at the front and a spring finger 16 clasps upon the rear side. The clip is held frictionally to the front except as hereinafter explained and is attached and detached in a lateral direction. When attached, a lug 17 on the flange 15 which has a threaded aperture 18 comes in substantial vertical alinement with the ear 12 on the shutter operating lever 7 throughout the vertical operative movement thereof.

The threaded aperture 18 is adapted to receive the attaching nipple 19 of a flexible shutter releasing cable of a familiar type embodying in the present instance, an inextensible tubular casing 20 terminating in a pull button 21 and an incompressible inner thrust member 22 terminating at its outer end in a push button 23. The inner end of the casing 20 is fixed to the nipple 19 while the inner end of the thrust member 22 is guided in these parts and adapted to project in the manner shown in Fig. 3 when the buttons 21 and 23 are pressed together.

The operation of the device is now thought to be obvious. The relative longitudinal movement of the members 20 and 22 causes the thrust member 22 to press the shutter operating lever 7 downwardly, as shown in Fig. 3, by the sliding engagement of its end with the ear 12 of the lever. This opens the shutter. When the buttons 21 and 23 are released, the operating member 5 returns itself and the lever 7 to the normal position of Fig. 2, closing the shutter, the cable device being customarily provided with an internal spring that maintains the thrust member 22 normally retracted as shown in Fig. 2.

While the reaction of the thrust communicated at 22 is taken up by the casing 21, it is also exerted in a manner tending to separate the clip 13 from the front 2 in an upward direction. I therefore prefer to positively interlock the clip with the front in this direction by providing a locking shoulder 24 on the clip that engages under a pin or other abutment 25 projecting from the front face of the front 2. This prevents upward displacement of the clip and yet it may be slidably engaged with or detached from the front in a lateral direction as readily as before.

The camera cannot be folded while the clip is in place for which reason it is made detachable but when removed it may be stored within the camera body previous to folding.

My invention is particularly applicable to cameras having the general characteristics shown where the shutter mechanism is located almost entirely within or in rear of the front making direct application of a cable release to the exterior difficult.

I claim as my invention:

1. In a detachable shutter releasing device, the combination with a camera front, a shutter mounted thereon and a shutter operating member, of a clip detachably engaged with and embracing an edge of the front and two relatively longitudinally movable flexible actuating members, one of which is inextensible and the other incompressible, one of said members being adapted to move against the operating member while the other is adapted to react against the clip.

2. In a detachable shutter releasing device, the combination with a camera front, a shutter mounted thereon and a shutter operating member, of a substantially L-shaped clip detachably engaged over a corner of the front and two relatively longitudinally movable flexible actuating members, one of which is inextensible and the other of which is incompressible, one of said members being adapted to move against the operating member while the other is adapted to react against the clip.

3. In a detachable shutter releasing device, the combination with a shutter support and a shutter operating member thereon, of a clip detachably engaging the support, two relatively longitudinally movable flexible actuating members, one of which is inextensible and the other of which is incompressible, one of said members being adapted to move against the operating member while the other is adapted to react against the clip, and interlocking devices on the clip and support, said devices being moved into engagement as the clip is applied in a direction transverse to the direction of relative movement of the actuating members.

4. In a detachable shutter releasing device, the combination with a camera front having an abutment on one face thereof, a shutter mounted on the front and a shutter operating member on the other face of the latter, of a substantially L-shaped clip detachably engaged over a corner of the front and having a locking shoulder coöperating with the abutment on the latter and two relatively longitudinally movable flexible actuating members one of which is inextensible and the other of which is incompressible, one of said members being adapted to move against the operating member while the other is adapted to react against the clip in a direction transverse to the direction in which the said shoulder and locking abutment engage.

5. A detachable shutter releasing device comprising a substantially L-shaped clip adapted to embrace one corner of a camera front and coöperate with the edges thereof, one arm of the clip being provided with a locking shoulder and the other with a flange, and two relatively longitudinally movable flexible actuating members, one of which is inextensible and the other of which is incompressible, one of said members being adapted to move against a shutter operating member while the other is attached to and adapted to react against the flange of the clip in a direction transverse to the locking shoulder.

PAUL J. MARKS.

Witnesses:
RUSSELL B. GRIFFITH,
AGNES NESBETT BISSELL.

Copies of this patent may be obtained for five cents each, by addressing the "Commissioner of Patents, Washington, D. C."